April 19, 1966  R. A. BROWN  3,246,377
BUCKLE FOR SAFETY BELTS
Filed Jan. 16, 1964  2 Sheets-Sheet 1

INVENTOR.
ROBERT A. BROWN
BY
Campston & Shaw
HIS ATTORNEYS.

April 19, 1966  R. A. BROWN  3,246,377
BUCKLE FOR SAFETY BELTS
Filed Jan. 16, 1964  2 Sheets-Sheet 2
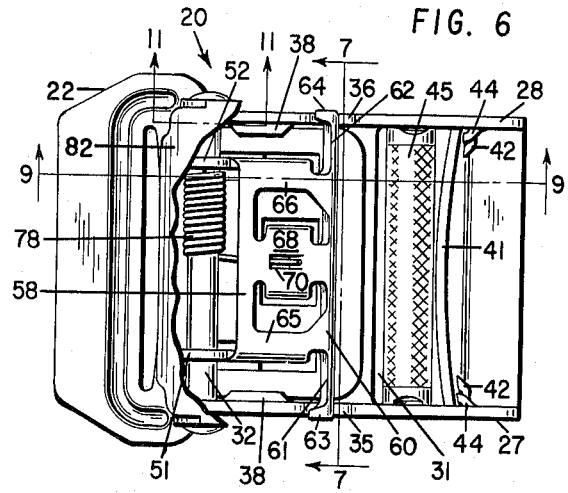
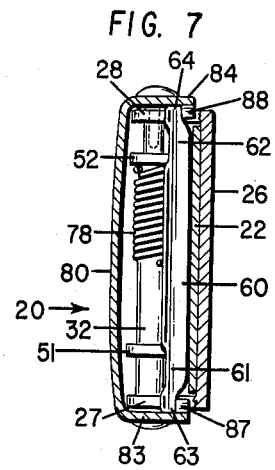
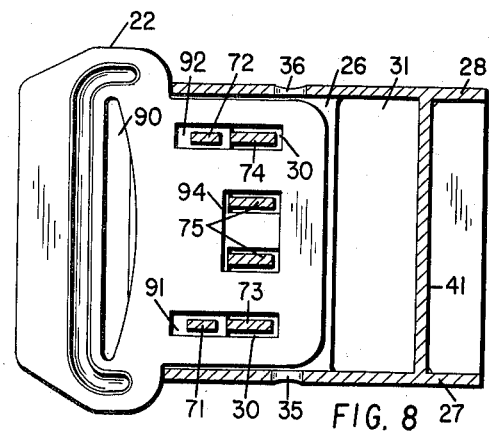
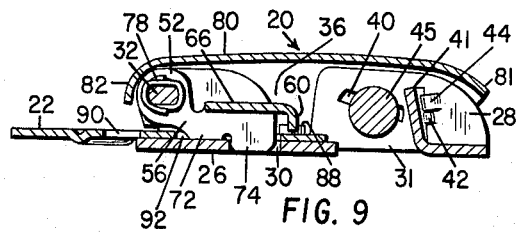
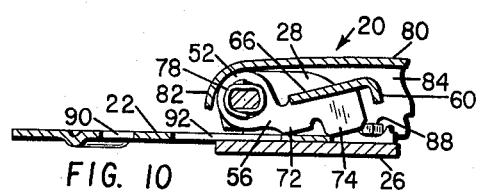
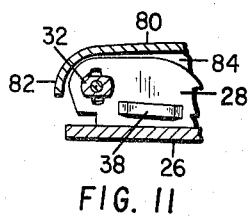
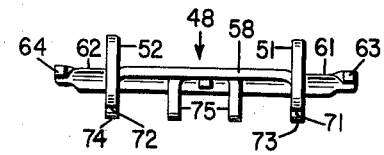
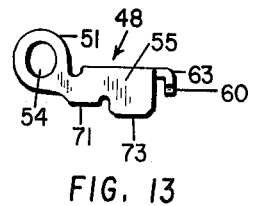
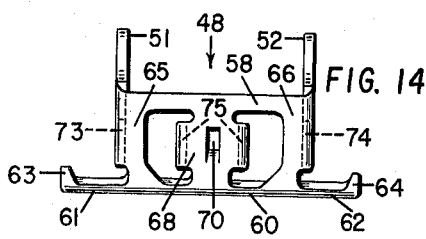
INVENTOR.
ROBERT A. BROWN
BY
HIS ATTORNEYS.

United States Patent Office 3,246,377
Patented Apr. 19, 1966

3,246,377
BUCKLE FOR SAFETY BELTS
Robert A. Brown, Rochester, N.Y., assignor to Hickok Manufacturing Co., Inc., Rochester, N.Y., a corporation of New York
Filed Jan. 16, 1964, Ser. No. 338,042
5 Claims. (Cl. 24—230)

This invention relates to buckles, and more particularly, to buckles for connecting the ends of safety belts such as are employed in airplanes and automobiles.

The design of safety buckles is now regulated by the statutes that have been enacted in many states in recent years, relating primarily to automobile safety belts. These statutes usually require that a buckle exceed some minimum strength and latch securely, yet reelase upon the exertion of a reasonably small opening force. In addition to these statutory requirements, good buckle design requires that a safety buckle must be capable of operation, during its entire useful life, free from such unsafe conditions as those known in the trade as false security and false latching. Both of these conditions are dangerous because the buckle, in these conditions, is not secure and stable.

Over and above these design and functional considerations, a buckle designer must face the ever-present problem of balancing against each other the need for an attractive appearance and the equally imperative need for keeping the cost per buckle down.

One type of safety belt buckle, that has been made in the past, is formed with a base plate on which a cover plate is piovtally secured. Both the base and the cover are formed with side flanges, and are generally channel-shaped in transverse section. The side flanges of the cover nest inside the side flanges of the base, when the buckle is closed. A latch is disposed between the cover and the base, and extends between the side flanges of the cover. The cover is connected to the latch, to open the latch when the cover is raised. This is an efficient construction from the mechanical point of view, because a direct and simple connection can be made between the cover and the latch.

However, this type of construction is not as economical to manufacture as might be desired. Since safety buckles are sold in mass markets, for example, for installation as original equipment in automobiles, costs per buckle are reckoned down to small fractions of a cent, and cost is an important competitive factor. In a buckle having the construction just described, both the cover and the base are exposed to view and must have an attractive appearance, and this is usually obtained by making both parts with a high finish, often with a chromeplated finish. This kind of buckle therefore involves a manufacturing cost that is higher than is desirable, not only because of the high finish, but also because of the cost of making the parts in such a way that they can receive and retain the high finish.

One object of this invention is to provide an improved, practical safety buckle.

Another object of the invention is to provide an improved, practical buckle for a safety belt, that has an attractive and decorative appearance, and that is relatively inexpensive to manufacture because of its structural design.

Another object of the invention is to provide an improved safety buckle that is relatively inexpensive to manufacture, as compared to competitive buckles.

A further object of the invention is to provide a practical safety buckle having a reliable mechanism, and that is convenient and easy to operate.

Yet another object of this invention is to provide an attractive safety buckle that has an improved structural design.

Still another object of the invention is to provide a buckle of the character described that requires a minimum number of parts and that is economical to manufacture and assemble.

A more specific object of the invention is to provide an improved, practical safety buckle that meets the statutory requirements of strength, security, and ease of operation, and that can be made with a highly attractive appearance, at a competitive cost.

Other objects of the invention will be apparent hereinafter from the specification and from the recital of the appended claims. To these and other ends, the invention resides in certain improvements and combinations of parts, all as will hereinafter be more fully described, the novel features being pointed out at the end of this specification.

In the drawings:

FIG. 6 is a top plan view of the buckle alone, with part of the cover plate broken away, to show the relative positions of the several parts in the interior of the buckle;

FIG. 7 is a section taken on the line 7—7 of FIG. 6, looking in the direction of the arrows;

FIG. 8 is a section taken on the line 8—8 of FIG. 3, looking in the direction of the arrows, and showing how the latch fingers engage in the openings in the tongue or connector plate and in the base plate;

FIG. 9 is a section taken on the line 9—9 of FIG. 6, looking in the direction of the arrows;

FIG. 10 is a fragmentary section taken in the same plane as was FIG. 9, but showing the tongue plate in the process of being inserted in the buckle, with the latch partly raised to permit the insertion;

FIG. 11 is a fragmentary section on the line 11—11 of FIG. 6, looking in the direction of the arrows;

FIG. 12 is an end elevation of the latch alone, seen as viewed from the left in FIG. 9;

FIG. 13 is a side elevation of the latch, as seen from the right relative to FIG. 12; and FIG. 14 is a top plan view thereof.

Referring now in detail to the drawings by numerals of reference, the numeral 20 denotes generally the latching part of the buckle, that is adjustably secured to one end 21 of a safety belt. The tongue or connector 22 is secured in a loop in the other end 24 of the safety belt, and the tongue is inserted in the latching half of the buckle and is latched therein, to fasten the two belt ends together.

Figure 1:
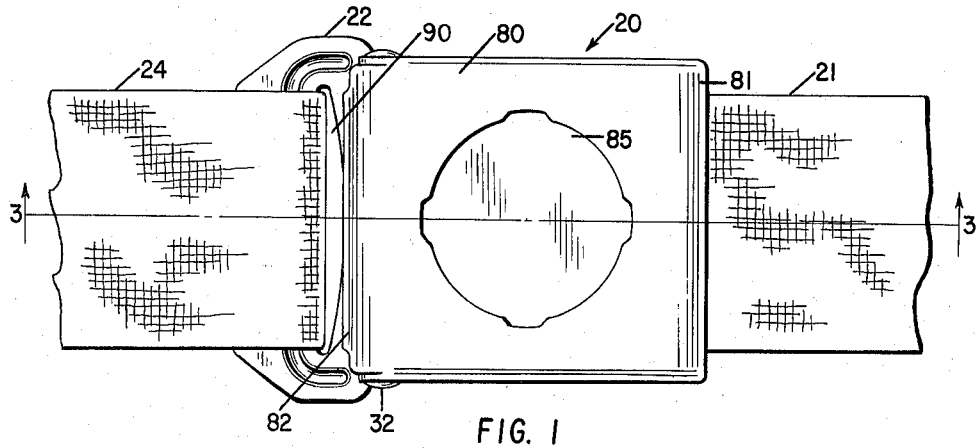
FIG. 1 is a fragmentary top plan view of a safety belt having a buckle that is constructed in accordance with one preferred embodiment of the present invention, showing the buckle in its closed position, with the belt ends connected.
Figure 2:
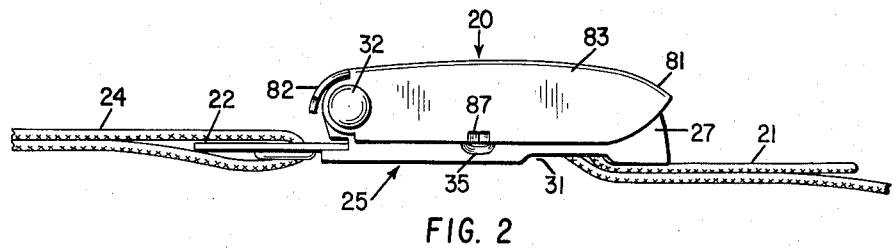
FIG. 2 is a fragmentary side elevation thereof.
Figure 3:
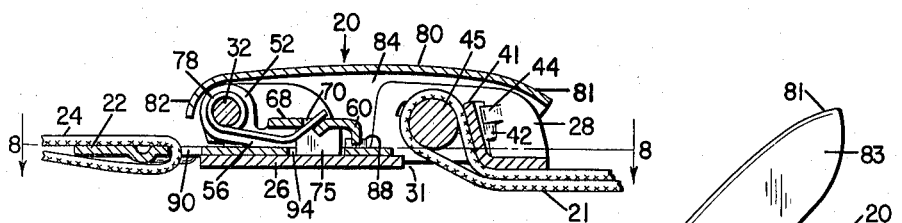
FIG. 3 is a fragmentary section thereof, taken on the line 3—3 of FIG. 1, looking in the direction of the arrows.

The latching part 20 of the belt buckle includes a base that is generally indicated by the numeral 25 (FIG. 2). This base is channel-shaped in transverse section and consists of a plate or web portion 26 that has a pair of integral upstanding side flanges 27 and 28 respectively. The web portion 26 of the base is formed intermediate its ends with four generally rectangular holes 30 (FIGS. 8 and 9) that are disposed in aligned, spaced relation across the web portion of the base, and that are disposed with their lengths extending lengthwise of the base. The base is also formed with a relatively large, transversely extending, generally rectangular opening 31, through which the belt end 21 is inserted.

Figure 4:
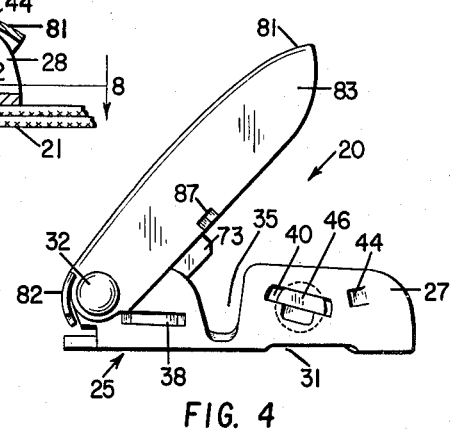
FIG. 4 is a side elevation of the buckle without the tongue plate or connector, and showing the cover raised so that the buckle is in an open position.
Figure 5:
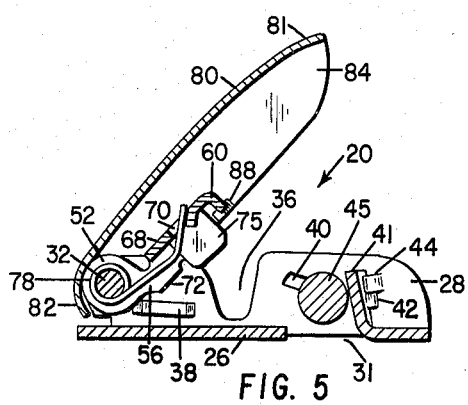
FIG. 5 is a transverse sectional view thereof in the same position as shown in FIG. 4, the section being taken in the same plane as the section shown in FIG. 3.

The two side flanges 27 and 28 are generally alike in structure. At one of their ends, they are formed with openings in which a spindle or pivot pin 32 is mounted. The flanges are also formed, intermediate their ends, with elongate, curved, downwardly extending recesses 35 and 36 respectively. These side flanges are also formed, intermediate the pivot pin 32 and the recesses 35 and 36 respectively, with inwardly facing gibs 38 (FIGS. 4, 5 and 11), that are formed by pressing in elongate, generally rectangular portions of the flanges. The side flanges 27 and 28 are also formed with elongate, generally rectangular, inclined slots 40 (FIGS. 4, 5 and 9), that are disposed intermediate the recesses 35 and 36 and to the right end of the buckle relative to the drawings.

The web portion 26 is formed adjacent its right end relative to the drawings with an upstruck bar 41 that is inclined from its bottom to its top toward the left end of the buckle. A pair of ears 42 are struck out from the two opposite sides of the bar 41, adjacent a similar pair of ears 44 that are struck out from the side flanges 27 and 28 respectively, just above the ears on the bar. These two pairs of ears help rigidify the structure and help hold the bar 41 against movement when the buckle is in use.

A cylindrical bar 45, that is formed with a roughened surface, is formed at its ends with a pair of flat extensions 46 (FIG. 4) that are disposed for sliding movement in the inclined slots 40 in the side flanges. This bar is disposed so that at one extremity of its sliding movement in the slots 40, its surface is in close proximity to, and confronts the surface of, the cross bar 41, and it is disposed directly above the opening 31 in the web portion 26 of the base.

A latch member, that is indicated by the general numeral 48 (FIGS. 12, 13 and 14), is formed at one of its ends with a pair of spaced but aligned end flanges 51 and 52 respectively, that are formed with generally circular openings 54 (FIG. 13) through which the pivot pin 32 is engaged. The openings 54 are sufficiently large in diameter so that the fit about the pivot pin 32 is loose to facilitate assembly and to permit inexpensive manufacturing procedures.

The latch 48 is formed with a web or frame portion that includes a pair of side flanges 55 and 56 respectively, that are integral with the flanges 51 and 52 respectively. The frame of the latch also includes a cross bar 58 that is integral with and that interconnects the side flanges 55 and 56 respectively, and a transverse latching bar 60 that is disposed to project from the right end of the latch relative to the drawings, and to extend downwardly. The transverse bar 60 is formed with laterally projecting arms 61 and 62 respectively, that project through the recesses 35 and 36. These arms are formed respectively at their outer extremities with ears 63 and 64 that extend lengthwise of the latch, toward the pivot pin 32.

The latch is also formed with beam members 65 and 66 (FIG. 14) respectively at its opposite sides. These beam members are integral with the side flanges 55 and 56 respectively and interconnect the cross bar 58 and the transverse bar 60. Intermediate these beam members, the latch is formed with a center beam portion 68 that is also integral with and interconnects the cross bar 58 and the transverse bar 60. This beam member 68 is formed with a central, generally rectangular slot 70 (FIG. 14).

The side flanges 55 and 56 of the latch are formed, along their lower surfaces, with a pair of camming surfaces 71 and 72 respectively, and with a pair of aligned, downwardly depending latching fingers 73 and 74. The latch is also formed with two other downwardly depending latching fingers 75, that are aligned with the fingers 73 and 74 respectively, and that are formed as downstruck tabs from the central beam member 68.

A torsion spring 78, of substantial and strong construction, is coiled about the pivot pin 32, with one end anchored in the slot 70 of the latch, and the other end coiled tightly about an end portion of the pivot pin 32 that is formed with a rectangular configuration. This coil spring is disposed constantly to urge the latch toward the base.

The cover for the buckle comprises a web portion 80 that is gently curved toward the base at its right end 81, to facilitate grasping the cover for opening the buckle. The web 80 is more fully curved at its opposite end 82 to provide a decorative skirt that covers the operating mechanism of the buckle. The cover is also formed with a pair of side flanges 83 and 84 respectively, that are formed at their left ends with aligned circular apertures through which the pivot pin 32 is passed, to permit pivotal movement of the cover about the pivot pin. These side flanges 83 and 84 are disposed to engage over the corresponding side flanges 27 and 28 respectively of the base, and are disposed in closely confronting relationship therewith.

The web portion 80 of the cover may be formed, if desired, with a recess 85, to enhance its appearance, or to receive a decorative emblem therein. The side flanges 83 and 84 of the cover are formed, in their respective lower marginal edges, with centrally disposed, inwardly projecting ears 87 and 88 respectively, that are disposed for engagement with the ears 63 and 64 that are disposed at the outer extremities of the arms 61 and 62 on the transverse bar 60 of the latch. The web portion 80 of the cover and the side flanges 83 and 84 of the cover preferably are formed with an attractive, smooth finish, such as, for example, a highly polished, chrome plated finish.

The tongue or connector plate 22 is formed with a transverse slot 90 (FIG. 8), through which the belt end 24 is threaded. The tongue is also formed with a pair of elongate, generally rectangular slots 91 and 92 respectively, at its opposite sides, that are disposed to register with the two outboard slots 30 in the base, when the buckle is latched, and also with the latching fingers 73 and 74. The tongue is also formed with a central, generally rectangular opening 94 of substantial transverse extent, that has a leading edge that is aligned with the leading edges of the slots 91 and 92 respectively, and that registers, in the locked position of the buckle, with the inner two of the holes 30 in the base, and with the inner two latching fingers 75.

To use a buckle that is made in accordance with the present invention, the tongue or connector is secured on one end of a safety belt by looping the belt end 24 through the slot 90 in the tongue, and then stitching the free end of the belt to its main reach to close the loop. The other end 21 of the belt is passed under and then over the rod 45, and then between the rod 45 and the retainer bar 41, in known fashion, to hold the buckle on the belt by friction, and to permit it to be easily adjustable.

To secure the two ends of the belt together, the tongue is inserted in the latching portion of the buckle. As the tongue is inserted, it engages the cam surfaces 71 and 72 respectively of the latch 48, and causes the latch to pivot in a counterclockwise direction, as shown in FIG. 10. As the latch is pivoted, the latch ears 63 and 64 disengage the inwardly projecting ears 87 and 88 respectively on the side flanges 83 and 84 of the cover. As the insertion of the tongue is continued, its leading edge eventually engages against the lower surfaces of the latching teeth. The latch remains in a pivoted position, above the base, until the slots 91 and 92, and the rectangular opening 94, are beneath the latching teeth, at which point the spring pivots the latch in a clockwise direction relative to FIG. 10, to engage the latching teeth through the holes in the tongue and also through the four openings 30 in the base, to secure the tongue in the latching portion of the buckle.

With the buckle in its latched position, any load that is applied, that tends to cause the tongue to move angularly relative to the latching portion, is resisted by the engagement of the tongue either against the web or against the gibs 38 on the side flanges 27 and 28 respectively. Therefore, any such force is not transmitted to the latch.

Any load that is applied to the belt, that would tend to force the tongue and the latching portion apart, is borne by the four latching fingers, which, because of the loose fit of the latch on the pivot pin 32, can be shifted slightly to the left relative to FIG. 9, so that the latch fingers engage against the shouldered surfaces of the base at the ends of the four openings 30.

To open the buckle and to separate the ends of the safety belt, the end 81 of the cover is grasped and pulled to cause the cover to pivot about the pivot pin 32, in a counterclockwise direction relative to FIG. 2. Since the latch ears 63 and 64 engage against the ears 87 and 88 respectively inside the cover side flanges, as the cover is moved, the latch is caused to move and it also pivots about the pivot pin 32 in a counterclockwise direction. The lowermost surfaces of the latching fingers preferably are relieved slightly so that the pivotal movement of the latch does not require that the latching fingers engage the tongue and force it to move so as to tighten the belt. This facilitates unlocking the buckle when the belt is under load. As soon as the latching teeth have cleared the holes in the tongue, the tongue may be removed from the locking portion of the buckle.

One important advantage of a buckle that is constructed in accordance with the present invention is that the gibs on the slide flanges of the base prevent any pivotal movement of the tongue relative to the base. This design feature insures that the load that is applied to latching fingers applies a compressive force to the respective end faces or shoulders of the latching fingers, and does not apply a turning moment, so as to insure optimum load carrying ability.

Another important feature of a buckle that is constructed in accordance with the present invention is that the base need not be highly finished, since it is almost always covered or concealed by the cover. This permits important economies in the manufacture of the buckle.

A further important advantage of a buckle that is constructed in accordance with the present invention is that, despite the fact that the side flanges of the base are interposed between the side flanges of the cover and the inner portions of the buckle, there is nevertheless direct mechanical engagement between the latch and the cover, to simplify the construction of the buckle, its manufacture, and its operation. Moreover, the direct engagement between the latch and the cover permits the use of only a single spring for operating the buckle and affords a still further economy.

While the invention has been disclosed herein by reference to the details of a preferred embodiment thereof, it is to be understood that such disclosure is intended in an illustrative, rather than into a limiting sense, and it is contemplated that various modifications in the construction and arrangement of the parts will readily occur to those skilled in the art, within the spirit of the invention and the scope of the appended claims.

What is claimed is:

1. A buckle comprising
  a base plate for attachment to one end of a belt, and that is formed with upstanding flanges at opposite sides thereof, said flanges being formed intermediate their ends with deep, downwardly extending recesses that are transversely aligned,
  a spindle that is mounted to extend between said flanges of the base plate,
  a connector plate for attachment to the other end of said belt and for insertion between the base plate and the spindle, to overlie the base plate, said connector plate being formed with a latching opening therein,
  a latch member that is mounted on said spindle for pivotal movement relative to said base intermediate the side flanges of the base, said latch member being formed with at least one latching finger for engagement in the latching opening of said connector plate for securing the connector plate to the base plate, and having a pair of arms that are disposed to project transversely of the base plate respectively and to project through the recesses in the side flanges of said base plate,
  a cover plate that is mounted on said spindle for pivotal movement relative to said base and that is formed with downwardly depending flanges at its opposite respective sides that are disposed to be in parallelism with the side flanges of the base plate and that are mounted to undergo their respective pivotal movements as a unit and in confronting, spaced relation to the side flanges of the base plate and outside the side flanges of the base plate,
  said side flanges of the cover plate being formed with a pair of inwardly projecting ears that are disposed for engagement under the arms of said latch member,
  and spring means disposed constantly to urge said latch member toward said base,
  the arms on said latch member and the ears on the side flanges of the cover being disposed and arranged to permit limited movement of the latch member relative to the cover, and to permit the cover to be pivoted about the spindle in one direction to move the latch member to disengage the connector plate for releasing the connector plate, and to transmit the spring pressure from said spring means to said cover to urge the cover toward the base.

2. A buckle in accordance with claim 1 wherein said side flanges of the base plate are formed respectively, intermediate the spindle and the recesses therein, with inwardly struck portions that provide gibs for engaging against the connector plate to confine the connector plate between said gibs and the base plate.

3. A buckle in accordance with claim 2 wherein said base plate is formed with at least one latching opening that is disposed to be in registry with the latching opening in the connector plate when the connector plate is fully inserted.

4. A buckle comprising:
  a base plate for attachment to one end of a belt, and that is formed with upstanding flanges at opposite sides thereof, said flanges being formed intermediate their ends respectively with elongate, downwardly extending recesses that are in transverse alignment with each other,
  a latch member that is mounted for pivotal movement relative to said base intermediate the side flanges of the base,
  a connector plate for attachment to the other end of said belt and for insertion between the base plate and the latch member, to overlie the base plate, said connector plate being formed with a latching opening therein,
  said latch member being formed with at least one latching finger for engagement in the latching opening of said connector plate for securing the connector plate to the base plate,
  a cover plate that is mounted for pivotal movement relative to said base plate about the same pivotal axis as the latch member and that is formed with downwardly depending flanges at its opposite respective sides that are disposed to engage about the side flanges of the base plate,
  means disposed at the opposite sides of said buckle respectively and mounted on one of said latch members and said cover side flanges, to project through said recesses for lost motion interconnection with the other to permit the cover to be pivoted in one direction for allowing the latch member to secure the connector plate to the base and in the opposite direction for moving the latch member to release the connector plate from the base, and to permit the cover to remain stationary as the latch member is pivoted upon insertion of the connector plate between the base plate and the latch member,
said lost motion interconnection comprising a pair of arms that project laterally from said latch member through said recesses in the side flanges of the base plate, and a pair of ears which each project inwardly from the side flanges of the cover plate respectively to engage under the ends of said arms.

5. In a buckle having a base plate, a connector plate insertable into said buckle over said base plate, a pivoted latch member for securing said connector plate and said base plate together, and a spring for biasing said latch member toward said base plate in a latched position, the improvement comprising:
  upstanding flanges formed on opposite sides of said base plate, each of said flanges being configured to define a downwardly extending recess,
  a cover plate mounted for pivotal movement relative to said base about the pivotal axis of said latch member and formed with a downwardly extending flange at each of its opposite sides disposed in a closed position to extend over and substantially conceal said base plate flanges,
  lost motion coupling means disposed on at least one of said cover plate and said latch member for extending laterally through each of said recesses, said coupling means including a pair of downward-facing surfaces on said latch member disposed in engagement with a respective pair of upward-facing surfaces on said cover plate so that said spring biases said cover plate toward said closed position,
  said cover plate and said latch member being configured to allow said latch member to be pivoted upward a limited amount without movement of said cover plate, and
  said coupling means being movable with said cover plate upward from said recesses for pivoting said latch member upward above said base plate to release said connector plate from said base plate.

References Cited by the Examiner
UNITED STATES PATENTS

| | | | |
|---|---|---|---|
| 3,013,317 | 12/1961 | Weber | 24—75 |
| 3,029,487 | 4/1962 | Asai | 24—230 |
| 3,137,907 | 6/1964 | Unai | 24—230 |

FOREIGN PATENTS 626,294   5/1927   France.

WILLIAM FELDMAN, *Primary Examiner.*
DONLEY J. STOCKING, *Examiner.*